United States Patent [19]

Brock

[11] Patent Number: 4,879,468

[45] Date of Patent: Nov. 7, 1989

[54] PHOTOIONIZATION OPTICAL FILTER AND DETECTOR

[75] Inventor: John C. Brock, Redondo Beach, Calif.

[73] Assignee: TRW Inc., Redondo Beach, Calif.

[21] Appl. No.: 791,663

[22] Filed: Oct. 28, 1985

[51] Int. Cl.[4] .............................................. G01J 5/36
[52] U.S. Cl. .................................. 250/374; 250/338.5; 250/340; 250/336.1
[58] Field of Search .................. 250/374, 338.5, 336.1, 250/340

[56] References Cited

U.S. PATENT DOCUMENTS

| | | | |
|---|---|---|---|
| 3,190,172 | 6/1965 | Langberg | 350/311 |
| 3,443,087 | 5/1969 | Robieux et al. | 250/290 |
| 3,454,828 | 7/1969 | Yamane | 315/111.91 |
| 3,489,942 | 1/1970 | Walsh et al. | 313/618 |
| 3,624,389 | 11/1971 | Cohen et al. | 250/310 |
| 3,772,519 | 11/1973 | Levy et al. | 250/284 |
| 3,891,559 | 6/1975 | Rast et al. | 350/311 |
| 3,937,959 | 2/1976 | Lyon | 250/290 |
| 3,941,670 | 3/1976 | Pratt, Jr. | 426/237 |
| 3,987,302 | 10/1976 | Hurst et al. | 250/423 P |
| 4,028,617 | 6/1977 | Kamo et al. | 313/336 |
| 4,085,332 | 4/1978 | Fletcher | 250/423 P |
| 4,148,586 | 4/1979 | Green et al. | 356/318 |
| 4,166,219 | 8/1979 | Ausschnitt et al. | 250/423 P |
| 4,184,127 | 1/1980 | Green et al. | 356/308 |
| 4,362,941 | 12/1982 | Castleman et al. | 250/385.1 |
| 4,402,606 | 9/1983 | Zalewski et al. | 356/315 |
| 4,429,228 | 1/1984 | Anderson | 250/374 |
| 4,600,840 | 7/1986 | Chutjian | 250/340 |

OTHER PUBLICATIONS

Marling et al., "An Ultrahigh—Q Isotropically Sensitive Optical Filter Employing Atomic Resonance Transitions", *Journal of Applied Physics*, vol. 50, No. 2, Feb. 1979, pp. 610-614.

Gelbwachs et al., "Atomic Vapor Quantum Counter: Narrow-Band Infrared Upconverter", *IEEE Transactions on Electron Devices*, vol. ED-27, No. 1, Jan. 1980, pp. 99-108.

Primary Examiner—Janice A. Howell
Assistant Examiner—William F. Rauchholz
Attorney, Agent, or Firm—Noel F. Heal; Sol L. Goldstein

[57] ABSTRACT

An optical filter and detector, and a related method for its operation, in which signal photons are admitted into a detector cell and selectively excite atoms or molecules of a vapor to a selected metastable state. An illuminating laser then photoionizes a large proportion of the excited atoms or molecules, and the resulting free electrons are collected as a measure of the number of incident signal photons. The initial excitation step to a metastable state is highly sensitive to the wavelength of the signal photons and therefore acts as a narrowband filter.

15 Claims, 1 Drawing Sheet

PHOTOIONIZATION OPTICAL FILTER AND DETECTOR

BACKGROUND OF THE INVENTION

This invention relates generally to techniques for selectively detecting photons and, more specifically, for detecting a weak omnidirectional and monochromatic photon signal in the presence of strong broadband background radiation, such as sunlight. There are many applications, such as laser communication receivers, environmental filters, and scatterometers, in which it is necessary to detect such a narrowband photon signal, perhaps resulting from a scattered laser pulse. Although very narrowband optical filters can be made using interferometric techniques, the photon acceptance angles of such filters are necessarily quite small, making them unsuitable for many applications.

One approach to narrow bandwidth filtering with wide acceptance angles is the use of atomic absorption/fluorescence filters, such as are described in a paper by Marling et al J. Appl. Phys. 50, 610 (1979). Atomic absorption/fluorescence narrow bandwidth infrared up-converters are described in a paper by Gelbachs et al., IEEE Trans. on Electron Devices, VOL ED-27, 99 (1980).

Two other areas of subject matter are also material to the field of the present invention, but, as will shortly be appreciated, are clearly distinguishable from the invention as defined in the claims. One area is opto-galvanic detection, and the other is isotopic separation by selective photoionization.

In opto-galvanic detection of optical absorptions, photons are absorbed by atoms and result in a transition to a bound, metastable, excited state of the atoms. Then the metastable-state atoms are ionized by the impact of electrons within a plasma. There are a number of difficulties with applying this technique to the detection of low light levels over narrow bandwidths. First, photons of different energies will excite atoms to different metastable states, all of which will be ionized, non-selectively, by electron impact within the plasma. Therefore, without careful optical prefiltering of the photons the opto-galvanic effect cannot discriminate between different photon energies, which correspond to different wavelengths. Another difficulty is that opto-galvanic filters are not effective in detecting low light levels. The opto-galvanic effect depends on a change in the plasma conditions caused by optical absorption. This generally requires illumination with a strong light source, such as a laser, so that enough new charge carriers are produced to change the measurable electrical impedance of the plasma. Other disadvantages are that opto-galvanic devices cannot be operated in a pulsed mode, and that the minimum achievable filter bandwidth is not narrow enough for some applications.

Examples of patents describing the optogalvanic effect are U.S. Pat. Nos. 4,148,586 and 4,184,127, both issued to Green et al. and 4,402,606 to Zalewski et al.

The process of isotopic separation by selective photoionization is described in U.S. Pat. Nos. 3,443,087 to Robieux et al., 3,772,519 to Levy et al. 3,937,956 to Lyon, and 4,085,332 to Fletcher et al. Isotopes, which have similar or identical chemical properties but different atomic weights, are difficult to separate by chemical means. In the photoionization process, photon beams are used to selectively ionize one isotope in a mixture of isotopes, and the resulting ions are separated out by application of an electric or magnetic field. To operate effectively, the separation technique requires that practically all of the atoms of the selected isotope will absorb photons and be transformed to a metastable or excited state, which can then be subsequently ionized and separated.

Another technical area of interest is that of optical filters based on resonance fluorescence or resonance scattering. In filters of this type, an incoming photon is absorbed in an atomic or molecular transition to an excited state. The atom or molecule in the excited state then reradiates a photon at the same or a lower frequency. A major disadvantage of this approach is that the reradiated photon must be collected and detected, or converted into an electron for detection, processes that usually decrease the efficiency of the filter.

It will be appreciated from the foregoing discussion that there is still a need for an optical filter that has an extremely narrow pass bandwidth, a wide photon acceptance angle, and the ability to detect small photon signals with high quantum efficiency in the presence of a broadband background level of radiation. The present invention is directed to this end.

SUMMARY OF THE INVENTION

The present invention resides in an optical detector employing the principle of photoionization to detect low-level signal photons and produce a corresponding electrical signal. Briefly, and in general terms, the optical filter of the invention comprises a chamber containing a selected atomic or molecular vapor, and means for admitting into the chamber signal photons of a particular wavelength to be detected, as well as photons of other wavelengths. The atomic or molecular vapor material is selected to absorb only the signal photons and to thereby produce atoms or molecules in a selected metastable or excited state. The filter and detector also include a photoionizing light source, to raise a large proportion of the atoms or molecules in the selected metastable state to the ionization continuum, thereby producing ions and free electrons. Also included are means for generating an electric field across the chamber and thereby collecting and detecting the free electrons as a measurable electric current.

In a preferred embodiment of the invention, the photoionizing light source is a laser, but in a broader sense the invention may include an incoherent light source. In one illustrative embodiment of the invention, the atomic or molecular vapor is initially at an unexcited or ground state, and the absorption of signal photons produces atoms or molecules raised to the selected metastable state. More generally, however, the atoms or molecules of the vapor may be first raised to a lower metastable state by another energy source, then raised to the selected metastable state from the lower metastable state, by action of the signal photons.

In accordance with an important aspect of the invention, the detector can be adjusted to provide a desired level of amplification of its output. For this purpose, the chamber also contains a buffer gas, and the means for generating an electric field includes a voltage source adjusted to provide amplification of the detected free electrons by means of multiple collisions and further ionization of the buffer gas.

In one form of the invention apparatus, the laser means has a cavity in which the chamber is at least partly disposed. In other words, the chamber is an intracavity chamber. Alternatively, the chamber can be an extra-cavity chamber without departing from the principles of the invention.

With the appropriate selection of the atomic or molecular vapor material, the filter can be designed as a multi-channel device sensitive to more than one narrowband wavelength. Some atomic or molecular systems will absorb photons at different wavelengths and effect transitions to different metastable states. When these states are further excited to the ionization continuum, resulting free electrons can be detected for both wavelengths or channels. To limit the detection function to only one selected wavelength requires only the addition of a relatively inexpensive optical filter element to preclude the entry of photos at wavelengths shorter than the selected wavelength.

In one important form of the filter/detector of the invention, the spatial relationships of incident signal photons is preserved in the device, and the resulting free electrons are detected in a segmented electrode array. Accordingly, the device functions as an imaging detector. In the imaging form of the invention, the means for generating an electric field produces a spatially uniform field over a relatively broad area, such that the free electrons migrate towards the segmented electrode array in substantially parallel paths, to preserve the spatial integrity of the signal photons entering the device.

In terms of a novel method, the invention includes the steps of selecting an atomic or molecular system to provide absorption of signal photons of a desired wavelength, absorbing signal photons in a vapor cloud of the selected atomic or molecular system and thereby transforming atoms or molecules of the vapor to a selected metastable or excited state. The method further includes optically pumping a substantial proportion of the metastable-state atoms or molecules to an ionized state in which electrons are freed, and collecting the free electrons in an electric field. The step of optically pumping is effected either by disposing the vapor cloud in the cavity of a suitable laser, or by exposing the vapor cloud to a laser beam emitted from a laser cavity. Another important aspect of the method includes applying a sufficiently strong electric field to produce further ionization and resultant amplification of the number of free electrons proportional to the original photon signal.

It will be appreciated from the foregoing that the present invention represents a significant advance in the field of optical filtering and detection. In particular, the invention provides a novel technique for detecting extremely low signal levels of narrowband photon radiation and filtering out any background radiation at other frequencies. Other aspects and advantages of the invention will become apparent from the following more detailed description, taken in conjunction with the accompanying drawings.

DESCRIPTION OF THE PREFERRED EMBODIMENTS

Figure 1:
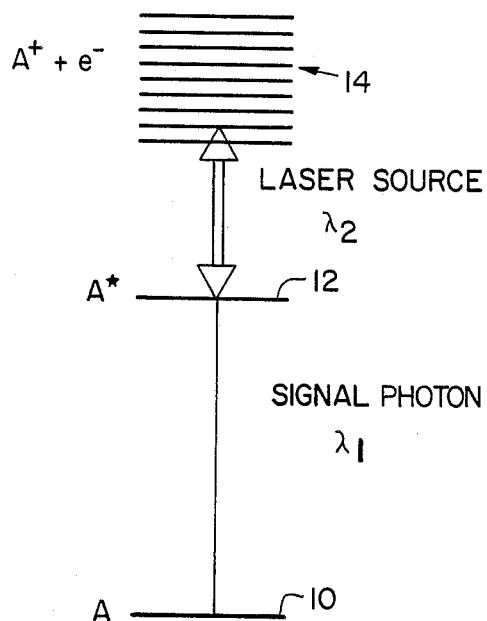
FIG. 1 is an energy diagram showing the principle of the invention.

As shown in the drawings for purposes of illustration, the present invention is concerned with a photoionization technique for the detection of low-level signal photons in the presence of higher levels of background radiation. Prior approaches to low-level photon detection have various drawbacks, as discussed in the preceding background section.

In accordance with the present invention, photons are detected in a two-stage process that includes a filtering stage in which atoms or molecules are excited to a selected metastable state by the selective absorption of signal photons, and a photoionization stage in which the excited atoms or molecules are ionized by photons from an illuminating light source, which is preferably but not essentially a laser source. The key to the process is that, for the most part, only atoms or molecules in the selected metastable state can be raised to the ionization state by the photoionization step, and these excited atoms or molecules are produced only as a result of absorption of signal photons. Accordingly, the number of ions and free electrons that are produced by photoionization is directly related to the number of signal photons admitted to the device.

The principles of physics relating to atomic excitation by photon absorption are well known by those working in the field, and will be described only in simple terms by way of brief background. Although the description will use the term "atoms," it will be understood that the phenomena described apply equally well to molecules, that is to chemical combinations of more than one atom. An atom in its natural or unexcited state has an energy level usually called the ground state. This is referred to by the symbol A, and indicated diagrammatically by the horizontal line 10 in FIG. 1. When a photon is absorbed by an atom initially at the ground state, the structure of electrons surrounding the nucleus of the atom is disturbed, and the atom makes a transition to an excited state, referred to as a metastable state. Photons of different energies, corresponding to different wavelengths of light, will raise the atom to different metastable energy states, most of which are relatively unstable and can be sustained for lifetimes measured in microseconds or nanoseconds. One of the metastable energy states, referred to by the symbol A*, is indicated at 12 in FIG. 1.

If an atom absorbs sufficient energy in the form of photons, its energy state may be raised to the ionization state, in which a positive ion, referred to as A+, is formed, along with a free electron. The ionization state is shown in FIG. 1 as a continuous region 14, and is also referred to as the ionization continuum. A positive ion is an atom from which one electron has been removed, leaving a net positive charge, since the electron carries a negative charge. An energy transition to the ionization continuum differs from transitions to a metastable state in that sufficient energy has been transferred to dislodge an electron from an atom. In the metastable states, the electrons surrounding the atomic nucleus are still "bound" to the nucleus. In the ionization continuum, an electron is freed from its bound condition.

An important aspect of the invention is that the absorption of a single photon is insufficient to raise the atom from the ground state to the ionization state. In the two-stage transition to the ionization continuum, an atom must first absorb a signal photon to be raised to the A* metastable state, and then absorb one or more photons from the illuminating laser source to raise it to the ionization continuum. By appropriate selection of the atomic material used in the filter/detector of the invention, it can be predetermined that two photon absorptions from the illuminating laser source will be insufficient to ionize an atom from the ground state, but one photon from the illuminating laser source will be sufficient to effect photoionization of an atom in a selected metastable state.

Figure 2:
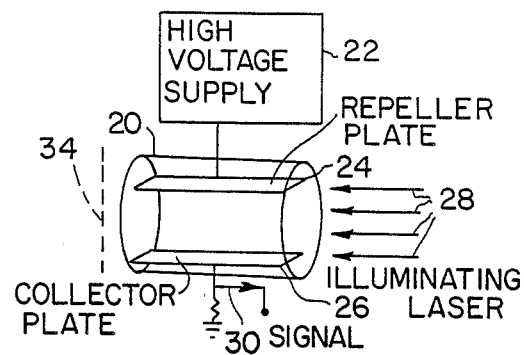
FIG. 2 is a schematic diagram of an optical filter/detector in accordance with the invention.

The apparatus of the invention is shown schematically in FIG. 2. It includes an atomic or molecular vapor cell 20, which contains the selected atomic or molecular material, and is maintained at a temperature sufficient to sustain within it a vapor cloud of the atomic or molecular material. The apparatus also includes a high-voltage power supply 22 connected across two electrode plates 24 and 26 positioned within the cell 20. The illuminating laser source, indicated by the arrows 28, provides a stream of photons at the wavelength of the laser, which is not shown. The cell 20 may be located within the cavity of the illuminating laser, or within a beam emanating from the laser cavity. Signal photons may be admitted to the cell 20 from virtually any direction, and provision has to be made for an appropriate window in the cell walls. Signal photons excite atoms of the vapor to the A* metastable state, and then photons from the illuminating laser immediately raise the energy level of a large proportion of the metastable-state atoms to the ionization continuum. The resulting free electrons are collected on the electrode plate 26, and detected as an electrical current, as indicated at 30. The positive ions migrate to the other electrode plate 24, where they recombine with electrons and return to the ground state. Other electrode geometries can be used to advantage, and it will be understood that the plate geometry shown is merely one example.

The filter bandwidth of the device described is determined by the lineshape of the transition from the ground state to the metastable state A*. For some atomic or molecular vapors, there may be more than one significant metastable state from which photoionization may take place. In other words, signal photons of two or more different wavelengths may be absorbed by atoms, which will subsequently be pumped to the ionization continuum. Thus it is possible to configure the apparatus of the invention to function as a multichannel filter providing, in effect, multiple passbands for photons of different wavelengths. Alternatively, the apparatus may be easily adapted to operate as a single-channel device by incorporating a simple and inexpensive optical filter, indicated at 34, to block the signal photons at higher energies than the desired one. Photons at lower energies that also result in meaningful transitions will be automatically "blocked," since the absorption of an additional photon from the illuminating laser will not raise the absorbing atoms to the ionization continuum. Therefore, the optical filter can be an inexpensive short-wavelength-blocking filter, or, in terms of frequency, a low-pass filter.

As previously mentioned, it is conceivable that multiple-photon absorption from the illuminating laser can result in ionization, without the detection of a signal photon. This potential source of noise in the detection apparatus can be minimized by selecting the atomic vapor to provide that two photon absorptions, of photons from the illuminating laser, are insufficient to raise an atom from the ground state to the ionization continuum. There is still the possibility of multiple photon absorptions involving three or more photons, but these events are less likely to occur.

By way of example, cesium may be used as the atomic vapor in the cell 20. Other possible materials are potassium, barium, sodium and calcium. Cesium has a significant metastable state referred to as the $7^2P$ state. The $7^2P$ state includes two energy sub-states: the $7^2P_{3/2}$ state, which is reached by absorption of photons at a wavelength of 455.5 nm (nanometers), and the $7^2P_{\frac{1}{2}}$ state, which is reached by absorption of photons at a wavelength of 459.3 nm. Photoionization from the $7^2P_{3/2}$ and $7^2P_{\frac{1}{2}}$ states requires the illuminating laser to have a wavelength above a threshold of 1058 nm and 1039 nm, respectively. Also of interest is the energy state referred to as $6^2P$, which is reached via various transitions from other energy states. Although the $6^2P$ state has an extremely short radiative lifetime of about 30 ns (nanoseconds), its effective lifetime can be increased to microseconds by taking advantage of a phenomenon described as radiation trapping. When an excited atom makes a transition to a lower energy state, and in so doing emits a photon, the emitted photon may be reabsorbed before it can leave the atomic vapor cloud. The reabsorption produces another excited atom, and effectively increases the lifetime of the metastable state. The significance of this phenomenon is that a lower minimum laser flux is required for the illuminating laser if the atomic metastable state has a longer effective life.

By way of example, if the effective lifetime in the $6^2P$ state of cesium can be increased to 5 microseconds, a fifty-percent conversion efficiency can be obtained using a laser flux of only about 3 kW/cm$^2$, which can easily be obtained if the cell 20 is disposed within the cavity of a continuous-wave (CW) laser. Somewhat lower but still attractive efficiencies can be obtained using CW extra-cavity laser illumination.

Although not apparent from FIG. 1, the principle of the invention may also be applied if the level A (reference numeral 10) is not the ground state but a metastable state lower than the A* metastable state. The A state could first be populated by means of an additional light source; then the signal photons would raise some of the already excited atoms to the selected A* metastable state. As described with reference to FIG. 1, the photoionization step would then raise a large proportion of atoms in the A* state to the ionization state 14.

Another important aspect of the invention is that the effect of photoionization can be conveniently amplified within the detector itself. For this purpose, a buffer gas, such as argon, is also present in the cell 20. If the strength of the electric field employed to collect the electrons is increased, the electrons can be accelerated sufficiently to cause collisions with atoms of the buffer gas, thereby producing more ions and electrons. This multiplication effect is highly predictable, and provides a signal amplification function that may be easily controlled by varying the voltage applied to produce the electric field. Of course, electrical amplification may also be provided external to the filter/detector.

Selection of the illuminating laser is based on the atomic vapor contained in the cell 20, the lifetimes of the metastable states of the photonabsorbing atoms, the photoionization cross sections, and other factors. The cross section is a term used in physics to express the likelihood of collisions between particles or photons and atomic or nuclear systems. A large cross section is indicative of a high probability of ionization by photon absorption. Different designs will dictate different laser wavelengths and laser intensities. For the $7^2P_{\frac{1}{2}}$ state of cesium, a flux of 14.5 kW/cm² is required to yield a conversion efficiency of about fifty percent, i.e. fifty percent of the detected signal photons are converted to photoelectrons. Fluxes of this order can be achieved with most pulsed laser sources.

Pulsed operation has several advantages over CW operation of the illuminating laser. The higher laser fluxes that can be obtained in pulsed operation result in substantially larger photoionization rates and, therefore, higher photon-to-photoelectron conversion efficiencies. Also, in communications applications it is possible to synchronize the laser pulses with those of a transmitter of signal photons. This allows high levels of CW background radiation to be effectively ignored at the detector.

Selection of an appropriate ionizing laser wavelength is also an important design consideration. As the wavelength is increased above a threshold value, the photoionization cross section falls off rapidly, which means that there is a lower likelihood of photoionization collisions. Accordingly, it is usually desirable to select a wavelength as close to the threshold as possible. However, each of the photoionization transitions has a different cross section, a different effective metastable-state lifetime, and a different population fraction. As a result, best filter performance may be achieved for a laser wavelength that is less than optimum for a particular transition, but can be produced with a suitable flux or intensity.

As mentioned earlier, the invention is not necessarily limited to the use of a laser as a photoionizing source. An incoherent source, such as a flashlamp, arc lamp, resonance lamp, or blackbody source, could be employed if it were suitably filtered. It will be appreciated, of course, that the efficiency of a filter using an incoherent source would be much lower than if a laser source were used.

By way of further example of the use of a laser source, the $7^2P$ states of cesium have threshold wavelengths of 1039 nm for the $\frac{1}{2}$ substate and 1058 nm for the 3/2 substate. The latter wavelength of 1058 nm can be obtained from a Nd(neodymium):Glass laser, which can therefore be used to photoionize atoms in the 3/2 substate, derived from photon absorption at a wavelength of 455 nm. In addition, because of the close proximity of the $\frac{1}{2}$ and 3/2 energy substates, atoms in the $\frac{1}{2}$ substate, derived from photon absorptions at a wavelength of 459.3 nm, may be successfully ionized via the 3/2 substate if there is sufficiently rapid thermal mixing between the two substates.

As an alternative to the configuration shown diagrammatically in FIG. 2, the cathode 26 may be in the form of cylindrical screen, with the anode 24 taking the form of a single wire disposed along the cylindrical axis of the cell 20. The anode and cathode may be of any suitable material, such as tungsten. Cesium in the cell 20 is contained in a reservoir (not shown), which is heated to produce the desired vapor pressure of cesium within the cell. The remainder of the cell itself must also be heated to prevent deposition of the cesium on the interior cell surfaces.

Figure 3:
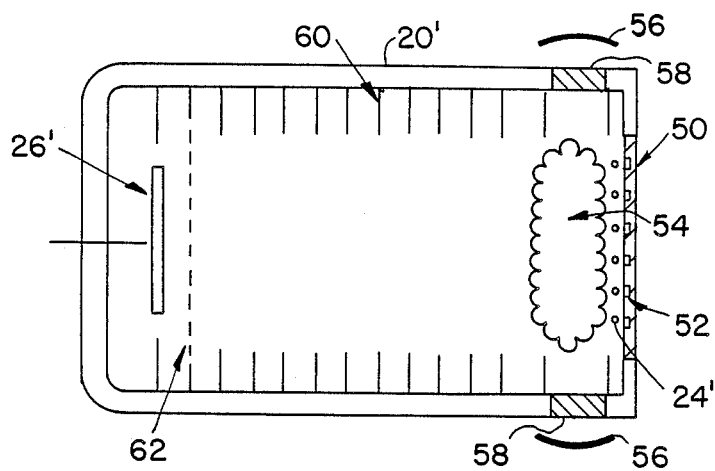
FIG. 3 is a schematic diagram of an imaging optical filter/detector in accordance with the invention.

Another important embodiment of the invention shown in FIG. 3. This includes a cylindrical cell 20' having a cathode 24' in the form of a wire screen located at one end of the cell, adjacent to an entrance window 50 for admission of signal photons. There is also a cathode mask 52 to prevent direct impact of photons on the cathode 24', and a segmented anode 26' disposed at the opposite end of the cell 20'.

As in the other embodiments described, the cell 20' contains an atomic cloud 54 of cesium or other atomic or molecular material. The cloud 54 is located, at least in part, within the cavity of an illuminating laser, reference numeral 56 indicating cavity mirrors for the laser. The cavity mirrors 56 are disposed diametrically with respect to the cell 20', and there are two diametrically disposed windows 58 in the cell 20' to allow the passage of photons within the laser cavity.

Within the cell 20' are a series of annular field guard rings 60, appropriately biased to provide a uniform electric field along the length of the cell. In principle, the cell 20' operates identically with the previously described cell 20. The only difference is that the spatial relationships of the incoming signal photons are retained during the filtering and detection process. Atoms in the vapor cloud absorb signal photons at a desired wavelength and make transitions to a predetermined metastable state. Then the illuminating laser photoionizes the metastable atoms, and the resulting free electrons are accelerated axially along the cell 20', through an anode screening grid 62 and to the segmented anode, where they are are detected as multiple electric currents. In this manner, the device operates as an imaging detector in a very narrow bandwidth of signal photons.

It will be appreciated from the foregoing that the present invention represents a significant advance in the field of optical filters and detectors. In particular, the invention provides a filter/detector capable of detecting very low levels of photon signals in a narrow bandwidth, regardless of the level of background radiation at other bandwidths. It also provides for amplification of the detected signals within the detector, and may be conveniently used in pulsed or CW modes of operation. Although a limited number of embodiments have been described by way of illustration, it will be understood that various modifications may be made without departing from the spirit and scope of the invention. Accordingly, the invention is not to be limited except as by the appended claims.

I claim:

1. A narrow-bandwidth photoionization optical filter and detector, comprising:
   a chamber containing a selected atomic or molecular vapor;
   means for admitting into the chamber signal photons of a particular wavelength to be detected, as well as photons of other wavelengths, wherein the atomic or molecular vapor material is selected to absorb only the signal photons and produce atoms or molecules in a metastable or excited state, in numerical proportion to the number of signal photons of the particular wavelength admitted into the chamber;
   a photoionizing light source, for raising a substantial proportion of atoms or molecules in the selected excited state to the ionization continuum, thereby producing ions and free electrons from the metastable atoms or molecules; and
   means for generating an electric field across the chamber and thereby collecting and detecting the free electrons as a measurable electric current proportional to the rate of admission of the signal photons.

2. A photoionization optical filter as defined in claim 1, wherein:
the photoionizing light source includes a laser for optically pumping a substantial proportion of atoms or molecules to the ionization continuum.

3. An optical filter as defined in claim 2, in which:
the means for generating an electric field includes a segmented electrode to provide a spatial image corresponding to the spatial relationship of the signal photons incident on the filter. claim 2, in which:
the chamber also contains a buffer gas; and
the means for generating an electric field includes a voltage source adjusted to provide amplification of the detected free electrons by means of multiple collisions and further ionization of the buffer gas.

4. An optical filter as defined in claim 2, in which:
the means for generating an electric field includes a voltage source adjusted to provide amplification of the detected free electrons by means of multiple collisions and further ionization of the buffer gas.

5. An optical filter as defined in claim 2, in which:
the laser means has a cavity in which the chamber is at least partly disposed.

6. An optical filter as defined in claim 2, in which:
the laser means includes a laser cavity and generates a laser beam that traverses the chamber, which is disposed outside of the laser cavity.

7. An optical filter as defined in claim 1, which:
the means for generating an electric field includes a segmented electrode to provide a spatial image corresponding to the spatial relationship of the signal photons incident on the filter.

8. An optical filter as defined in claim 1, in which:
the chamber also contains a buffer gas; and
The means for generating an electric field includes a voltage source adjusted to provide amplification of the detected free electrons by means of multiple collisions and further inonization of the buffer gas.

9. A method of detecting signal photons at a selected narrow bandwidth and low signal level, comprising the steps of:
selecting an atomic or molecular system to provide absorption of signal photons of the desired wavelength;
absorbing signal photons in a vapor cloud of the selected atomic or molecular system and thereby transforming atoms or molecules of the vapor to a selected excited metastable state, in numerical proportion to the number of signal photons of the particular wavelength admitted into the chamber;
optically pumping a large proportion of the metastable-state atoms or molecules to an ionized state in which electrons are freed; and
collecting the free electrons means of an electric field.

10. A method as defined in claim 9, in which:
the step of optically pumping is effected by disposing the vapor in the cavity of a suitable laser.

11. A method as defined in claim 9, in which:
the step of optically pumping is effected by exposing the vapor cloud to a laser beam emitted from a suitable laser cavity.

12. A method as defined in claim 9, and further comprising the step of:
applying a sufficiently strong electric field to produce further ionization and resultant amplification of the number of free electrons proportional to the original photon signal.

13. An imaging narrow-bandwidth photoionization optical filter and detector, comprising:
a chamber containing a selected atomic or molecular vapor;
means for admitting into the chamber an image array of signal photons of a particular wavelength to be detected, as well as photons of other wavelengths, wherein the atomic or molecular vapor material is selected to absorb only the signal photons and produce atoms or molecules in a metastable or excited state, in numerical proportion to the number of signal photons of the particular wavelength admitted into the chamber;
laser means for optically pumping a substantial proportion of the atoms or molecules in the excited state to the ionization continuum, thereby producing ions and free electrons from the metastable atoms or molecules;
a cathode and segmented anode structure disposed perpendicularly to the direction of signal photons admitted into the cell; and
means for electrically biasing the cathode and anode, whereby electrons produced by photoionization migrate toward the segmented anode and generate multiple electrical signals indicative of the image array of received signal photons.

14. An imaging photoionization optical filter and detector as defined in claim 13, and further comprising:
an optical blocking filter located to block admission of photons above a selected energy level, and thereby render the filter operable in only a single narrow bandwidth.

15. An imaging photoionization filter and detector as defined in claim 13, and further comprising:
a plurality of field guard rings spaced throughout the cell and electrically biased to provide a uniform electric field distribution through the cell.

* * * * *